United States Patent
Yan et al.

(10) Patent No.: US 9,343,975 B2
(45) Date of Patent: May 17, 2016

(54) POWER CONVERTER AND METHOD OF STABLING VOLTAGE GAIN

(71) Applicant: Delta Electronics (Shanghai) Co., Ltd., Shanghai (CN)

(72) Inventors: Chao Yan, Shanghai (CN); Wei-Qiang Zhang, Shanghai (CN); Li-Zhi Xu, Shanghai (CN); Xin-Lei Li, Shanghai (CN)

(73) Assignee: DELTA ELECTRONICS (SHANGHAI) CO., LTD. (CN)

( * ) Notice: Subject to any disclaimer, the term of this patent is extended or adjusted under 35 U.S.C. 154(b) by 98 days.

(21) Appl. No.: 14/245,357

(22) Filed: Apr. 4, 2014

(65) Prior Publication Data
US 2015/0049516 A1 Feb. 19, 2015

(30) Foreign Application Priority Data

Aug. 16, 2013 (CN) .......................... 2013 1 0360095

(51) Int. Cl.
*H02M 3/335* (2006.01)
*H02M 3/337* (2006.01)
(Continued)

(52) U.S. Cl.
CPC ........... *H02M 3/33507* (2013.01); *H02J 5/005* (2013.01); *H02M 3/3376* (2013.01); *H02M 2007/4815* (2013.01); *Y02B 70/1433* (2013.01); *Y02B 70/1441* (2013.01)

(58) Field of Classification Search
CPC ............. H02M 2007/4815; H02M 2001/0012; H02M 3/3376; Y02B 70/1491
USPC ....................................... 363/131, 132, 4–40
See application file for complete search history.

(56) References Cited

U.S. PATENT DOCUMENTS 5,968,398 A * 10/1999 Schmitt .................. H05B 6/062 219/620
6,294,900 B1 * 9/2001 Greenwood ...... H02M 3/33584 323/222
(Continued)

FOREIGN PATENT DOCUMENTS

| CN | 102522900 | 6/2012 |
|---|---|---|
| TW | 519802 | 2/2003 |
| TW | 201326801 | 7/2013 |

OTHER PUBLICATIONS

Chen, Qianhong, et al., "Analysis, Design and Control of a Transcutaneous Power Regulator for Artificial Hearts", IEEE Transactions on Biomedical Circuits and Systems, vol. 3, No. 1, Feb. 2009, pp. 23-31.
(Continued)

*Primary Examiner* — Rajnikant Patel
(74) *Attorney, Agent, or Firm* — Hauptman Ham, LLP

(57) ABSTRACT

A power converter includes a primary side compensation capacitor, a transformer and a secondary side compensation capacitor. The primary side compensation capacitor receives a first AC voltage from a first switch circuit. The transformer receives the first AC voltage to generate a second AC voltage. The secondary side compensation capacitor transfers the second AC voltage to a second switch circuit to generate a DC output voltage. The operating frequency of the first switch circuit is set within the 0.8*fa to 1.2*fb, and fb is at most 1.5 times of fa. The primary side compensation capacitor and a primary side leakage inductance of the transformer correspond to a first resonant frequency, the secondary side compensation capacitor and a secondary side leakage inductance of the transformer correspond to a second resonant frequency, fa and fb are the lower one and the higher one of the first and second resonant frequency respectively.

24 Claims, 12 Drawing Sheets

(51) Int. Cl.
*H02J 5/00* (2016.01)
*H02M 7/48* (2007.01)

(56) References Cited

U.S. PATENT DOCUMENTS

| | | | | |
|---|---|---|---|---|
| 6,822,518 B1 * | 11/2004 | Lin | ............... | H03F 1/223 |
| | | | | 330/296 |
| 7,110,268 B2 * | 9/2006 | Yasumura | ........... | H02M 3/3376 |
| | | | | 363/21.03 |
| 7,541,749 B2 | 6/2009 | Ushijima | | |
| 7,796,406 B2 * | 9/2010 | Lev | ............... | H02M 3/33592 |
| | | | | 363/132 |
| 8,238,125 B2 * | 8/2012 | Fells | ............... | H02J 7/025 |
| | | | | 363/16 |
| 9,006,624 B2 * | 4/2015 | Brosnan | ............... | H05B 6/04 |
| | | | | 219/620 |

OTHER PUBLICATIONS

Joung, Gyu Bum, et al., "An Energy Transmission System for an Artificial Heart Using Leakage Inductance Compensation of Transcutaneous Transformer", IEEE Transactions on Power Electronics, vol. 13, No. 5, Nov. 1998, pp. 1013-1022.

* cited by examiner

POWER CONVERTER AND METHOD OF STABLING VOLTAGE GAIN

RELATED APPLICATIONS

This application claims priority to China Application Serial Number 201310360095.3 filed Aug. 16, 2013, which is herein incorporated by reference.

BACKGROUND

1. Field of Invention

The present invention relates to a power converter. More particularly, the present invention relates to a power converter with stable voltage gain and method.

2. Description of Related Art

Wireless power transfer technology has been applied in many fields, such as electric cars, consumer electronics products, etc. The wireless power transfer technology enables the power transfer based on the electromagnetic induction principle.

Reference is made to FIG. 1A. FIG. 1A is a schematic diagram of a power converter 100 used in some approaches. As shown in FIG. 1A, the power converter 100 used in some approaches includes a transformer 120, a full bridge inverter circuit 140 and a bridge rectifying circuit 160. The transformer 120 is formed by the primary winding Ns and the secondary winding Ns, and the mutual inductance of these windings is M. The inductance value of the primary winding is L1 (which is referred to as primary inductor hereinafter), and the inductance value of the secondary winding is L2 (which is referred to as secondary inductor hereinafter). The full bridge inverter circuit converts the DC input voltage to the AC voltage VAC, and transfer the AC voltage VAC to the transformer 120 and the bridge rectifying circuit 160, so as to generate the DC output voltage $V_{Dcout}$. Further, the transformer 120 may have a larger leakage inductance with the larger air gaps between the primary winding Np and the secondary winding Ns. To compensate the leakage inductance of the transformer, the power converter 100 used in some approaches further includes a primary side compensation capacitor Cp and a secondary side compensation capacitor Cs.

Reference is made to FIG. 1B to FIG. 1E. FIG. 1B is a graph illustrating the relationship of the voltage gain AV of the power converter 100 with different load and the operating frequency. FIG. 1C is a graph illustrating the relationship of the input impedance of the power converter 100 with different load and the operating frequency. FIG. 1D is a graph illustrating the relationship of the voltage gain Av of the power converter 100 with different coupling factors k and the operating frequency. Further, FIG. 1E is a graph illustrating the relationship of the input impedance of the power converter 100 with different coupling factors k and the operating frequency. The operating frequency in FIG. 1B to FIG. 1E is the ratio of the operating frequency fo of the power converter 100 and the resonant frequency corresponding to the primary inductor L1 and the primary side compensation capacitor Cp. The voltage gain Av in FIG. 1B and FIG. 1D is the ratio of the DC output voltage $V_{dc,out}$ and the DC input voltage Vin in FIG. 1A. Req in FIG. 1C and FIG. 1E refers to the ratio of the imaginary part and the real part of the input impedance of the power converter 100.

As shown in FIG. 1B to FIG. 1E, in general, the operating frequency fo of the power converter 100 is set to be equal to the resonant frequency of the primary inductor L1 and the primary side compensation capacitor Cp, so that the input impedance is pure resistance, and the reactive power is thus reduced. However, the voltage gain Av of the power converter 100 deviates greatly with different loads or deviation of the coupling factor k, and thus the voltage between the internal circuits changes greatly. As a result, elements withstanding high voltage are utilized, and costs of the power converter rise. In addition, the deviation of the voltage gain of the power converter also makes an impact on the conversion efficiency of the power converter.

Therefore, a heretofore-unaddressed need exists to address the aforementioned deficiencies and inadequacies.

SUMMARY

One aspect of the present disclosure provides a power converter. The power converter includes a primary side compensation capacitor, a transformer and a secondary side compensation capacitor. The primary side compensation capacitor is configured to receive a first AC voltage from a first switch circuit. The transformer includes a primary winding and a secondary winding, and is configured to receive the first AC voltage to generate a second AC voltage. The primary winding of the transformer is electrically coupled to the primary side compensation capacitor in series. The secondary side compensation capacitor is electrically coupled to the secondary winding of the transformer in series, and is configured to transmit the second AC voltage to a second switch circuit to generate a DC output voltage. Wherein an operating frequency of the first switch circuit is set between 0.8×fa and 1.2×fb, where the fb is at most 1.5 times of the fa, and wherein the primary side compensation capacitor and an equivalent primary side leakage inductance of the transformer correspond to a first resonant frequency, the secondary side compensation capacitor and an equivalent secondary side leakage inductance of the transformer correspond to a second resonant frequency, the fa is the lower one of the first resonant frequency and the second resonant frequency, and the fb is the higher one of the first resonant frequency and the second resonant frequency, so that a voltage gain of the power converter with an empty load is at most 2 times of the voltage gain of the power converter with a full load.

According to one embodiment of the present disclosure, the power converter further includes a detect circuit and a control circuit. The detect circuit is configured to generate a control signal in accordance with the DC output voltage. The control circuit is configured to control the operating frequency of the first switch circuit in accordance with the control signal, so as to set the operating frequency between 0.8× fa and 1.2×fb when a coupling factor of the transformer deviates.

According to one embodiment of the present disclosure, the first switch circuit is an inverter circuit configured to generate the first AC voltage in accordance with the DC input voltage.

According to one embodiment of the present disclosure, the first switch circuit includes a bridge arm, the bridge arm comprising two switch units electrically coupled in series.

According to one embodiment of the present disclosure, the second switch circuit is a rectifying circuit configured to generate the DC output voltage in accordance with the second AC voltage.

According to one embodiment of the present disclosure, the second switch circuit includes a bridge arm. The bridge arm includes two switch units electrically coupled in series.

According to one embodiment of the present disclosure, the capacitance value of the secondary compensation capacitor is 1/N times of the capacitance value of the primary compensation capacitor, when the inductance value of the secondary winding is N times of the inductance value of the primary winding, wherein N>0.

According to one embodiment of the present disclosure, the operating frequency of the first switch circuit is further set between 0.94×fa and 1.065×fb, so that the voltage gain of the power converter with the empty load being at most 1.2 times of the voltage gain of the power converter with the full load.

Another one aspect of the present disclosure is to provide power converter. The power converter includes a first switch circuit, a primary side compensation capacitor, a transformer, a secondary side compensation capacitor, a second switch circuit, a detect circuit and a control circuit. The first switch circuit is configured to generate a first AC voltage in accordance with a DC input voltage. The primary side compensation capacitor is configured to receive the first AC voltage. The transformer includes a primary winding and a secondary winding. The primary winding is electrically coupled to the primary side compensation capacitor in series. The secondary winding is configured to generate a second AC voltage in accordance with the first AC voltage. The secondary side compensation capacitor is electrically coupled to the secondary winding in series. The second switch circuit is configured to generate a DC output capacitor in accordance with the second AC voltage. The detect circuit is configured to generate a control signal in accordance with the DC output voltage. The control circuit is configured to control the first switch circuit in accordance with the control signal to set an operating frequency of the first switch circuit between 0.8×fa and 1.2×fb, and the fb is at most 1.5 times of the fa. Wherein the primary side compensation capacitor and an equivalent primary side leakage inductance of the transformer correspond to a first resonant frequency, the secondary side compensation capacitor and an equivalent secondary side leakage inductance of the transformer correspond to a second resonant frequency, the fa is the lower one of the first resonant frequency and the second resonant frequency, and the fb is the higher one of the first resonant frequency and the second resonant frequency, so that a voltage gain of the power converter with an empty load is at most 2 times of the voltage gain of the power converter with a full load.

According to one embodiment of the present disclosure, the operating frequency of the first switch circuit is further set between 0.94×fa and 1.065×fb, so that the voltage gain of the power converter with an empty load is at most 1.2 times of the voltage gain of the power converter with a full load.

Yet another aspect of the present disclosure is to provide a method of stabilizing a voltage gain, which is adapted to a power converter. The power converter includes a primary side compensation capacitor, a transformer and a secondary side compensation capacitor. The primary side compensation capacitor is electrically coupled to a primary winding of the transformer in series, and the secondary side compensation capacitor is electrically coupled to a secondary winding of the transformer in series. The method includes following operations: (a) generating a first AC voltage to the primary side compensation capacitor by a switch circuit, so as to generate a second AC voltage to the secondary side compensation capacitor; (b) generating a DC output voltage in accordance with the second AC voltage; and (c) adjusting the switch circuit in accordance with the DC output voltage, so as to set an operating frequency of the switch circuit between 0.8×fa and 1.2×fb, and the fb is at most 1.5 times of the fa, wherein the primary side compensation capacitor and an equivalent primary side leakage inductance of the transformer correspond to a first resonant frequency, the secondary side compensation capacitor and an equivalent secondary side leakage inductance of the transformer correspond to a second resonant frequency, the fa is the lower one of the first resonant frequency and the second resonant frequency, and the fb is the higher one of the first resonant frequency and the second resonant frequency, so that a voltage gain of the power converter with an empty load is at most 2 times of the voltage gain of the power converter with a full load.

According to one embodiment of the present disclosure, the method further includes: providing a DC input voltage to the switch circuit to generate the first AC voltage, wherein the switch circuit includes an inverter circuit. The inverter circuit includes a bridge arm including two switch units electrically coupled in series.

According to one embodiment of the present disclosure, the step of generating the DC output voltage further includes: providing the second AC voltage to a rectifying circuit to generate the DC output voltage.

According to one embodiment of the present disclosure, the method further includes: setting the capacitance value of the secondary side compensation capacitor to be 1/N times of the capacitance value of the primary side compensation capacitor, when the inductance value of the secondary winding is N times of the inductance value of the primary winding, wherein NA.

According to one embodiment of the present disclosure, the method further includes: setting the operating frequency of the switch circuit between 0.94×fa and 1.065×fb, so that the voltage gain of the power converter with an empty load is at most 1.2 times of the voltage gain of the power converter with a full load.

In summary, the power converter in the present disclosure has a more stable voltage gain with different loads and different coupling factors k. As a result, the operation safety of the power converter under any operation circumstances is improved.

These and other features, aspects, and advantages of the present disclosure will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
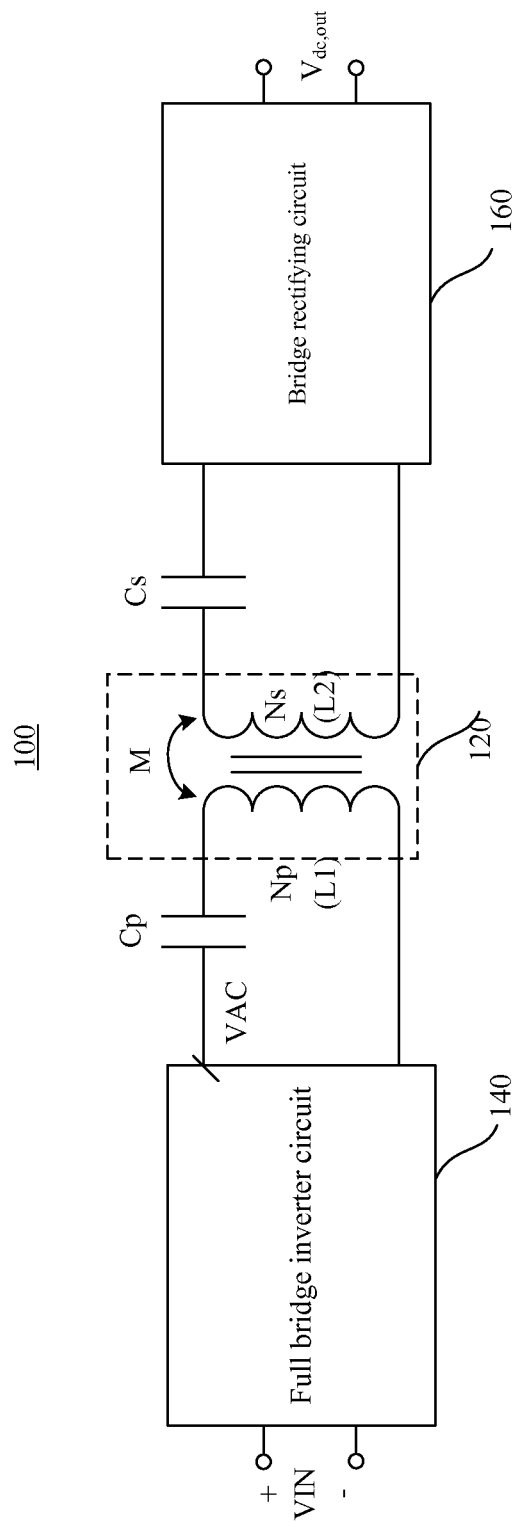
FIG. 1A is a schematic diagram of a power converter used in some approaches.
Figure 1B:
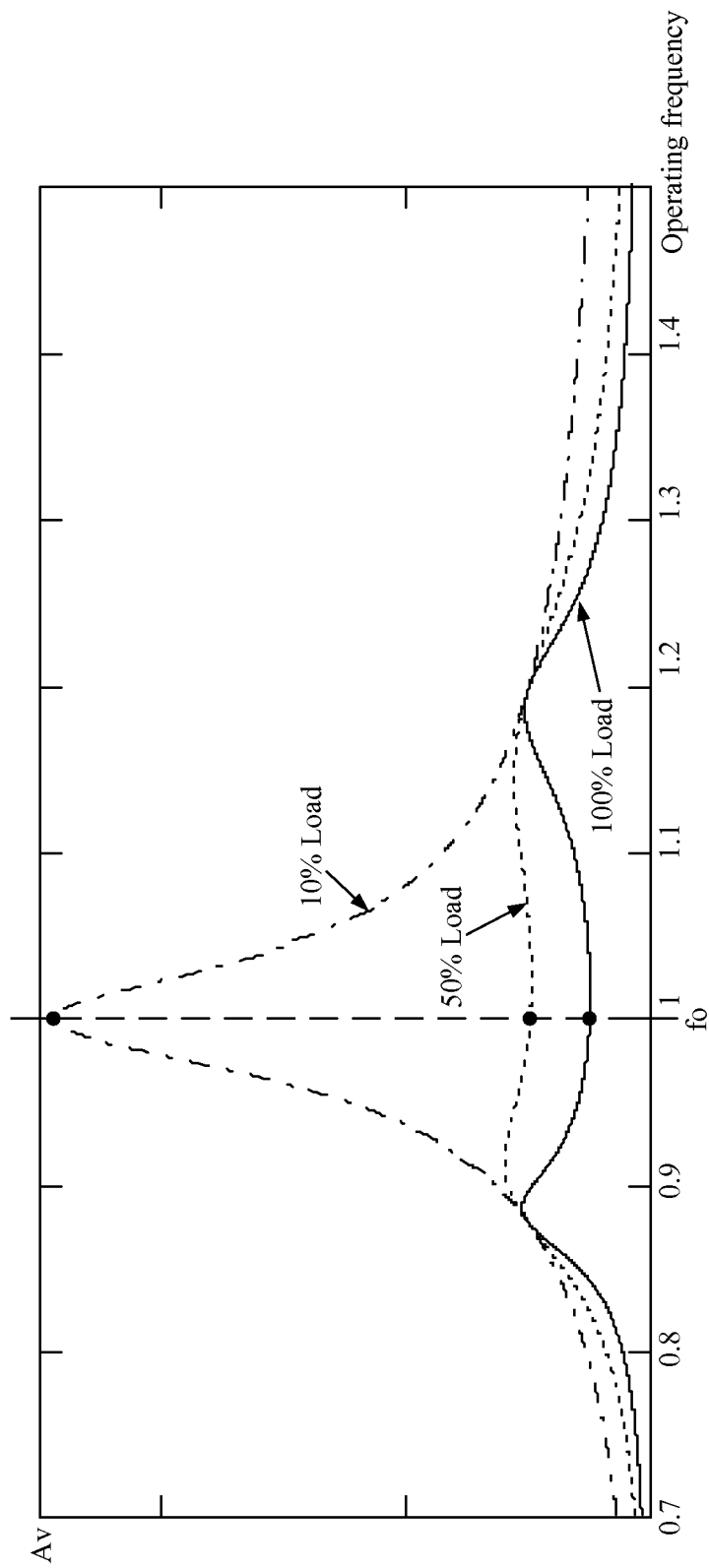
FIG. 1B is a graph illustrating the relationship of the voltage gain of the power converter in FIG. 1A with different load and the operating frequency.
Figure 1C:
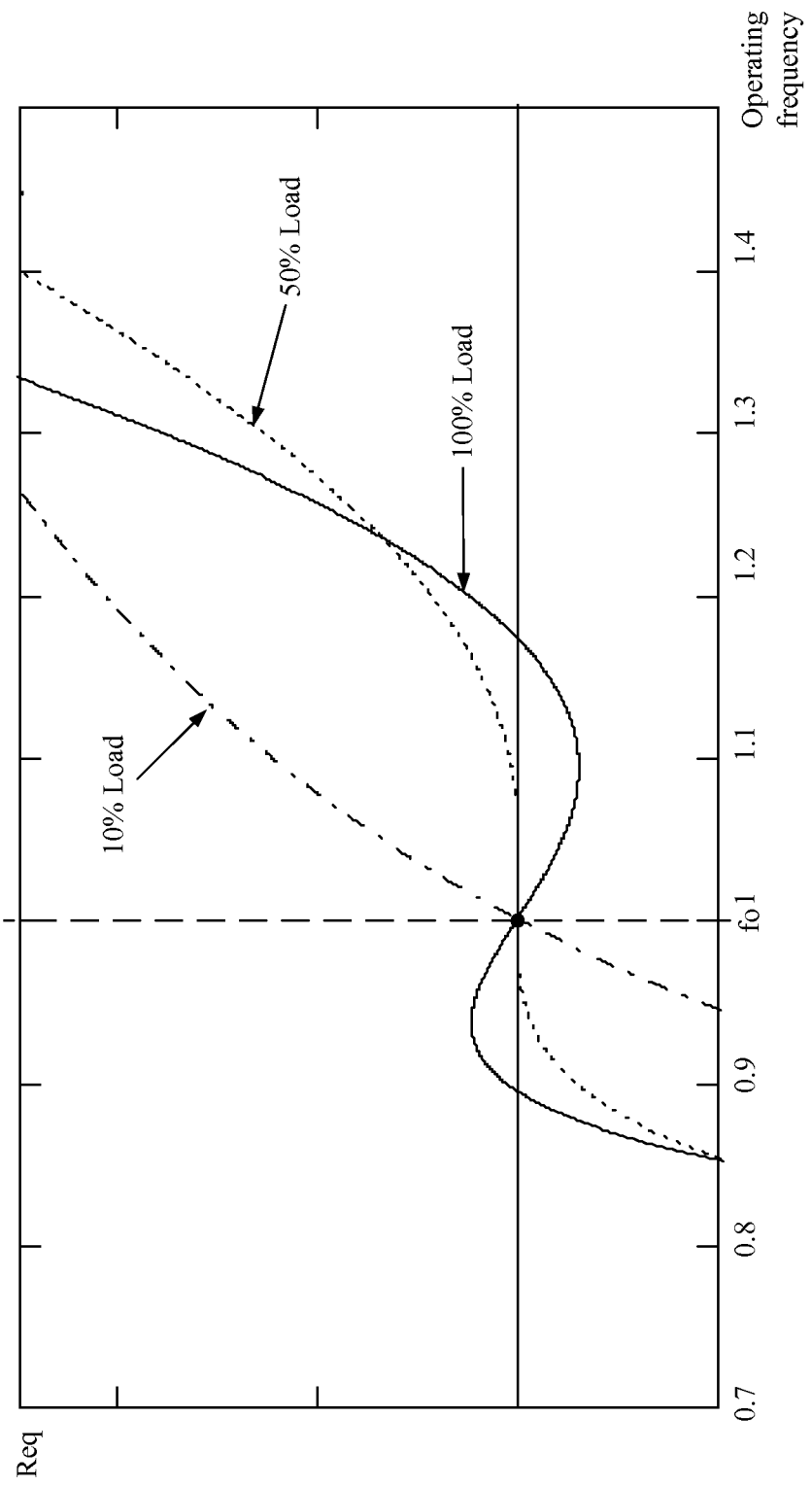
FIG. 1C is a graph illustrating the relationship of the input impedance of the power converter in FIG. 1A with different load and the operating frequency.
Figure 1D:
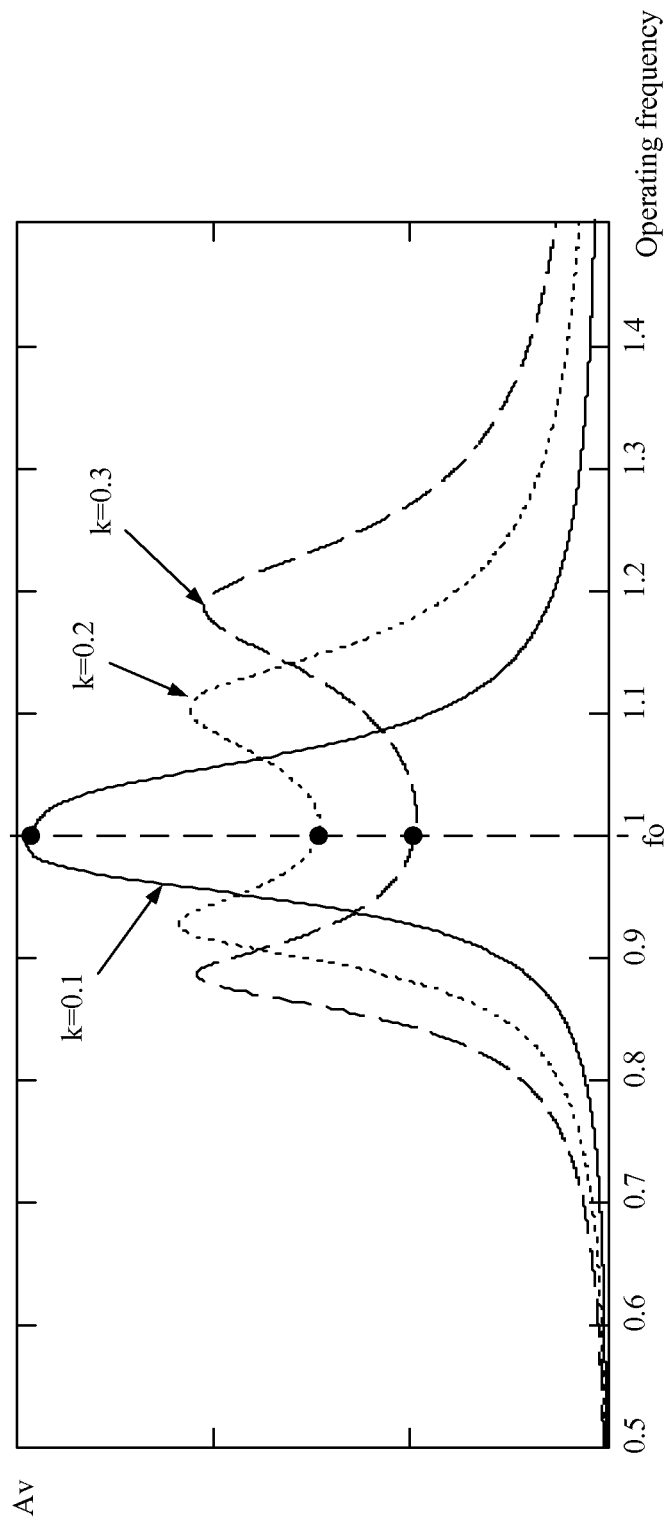
FIG. 1D is a graph illustrating the relationship of the voltage gain of the power converter; with different coupling factors k and the operating frequency.
Figure 1E:
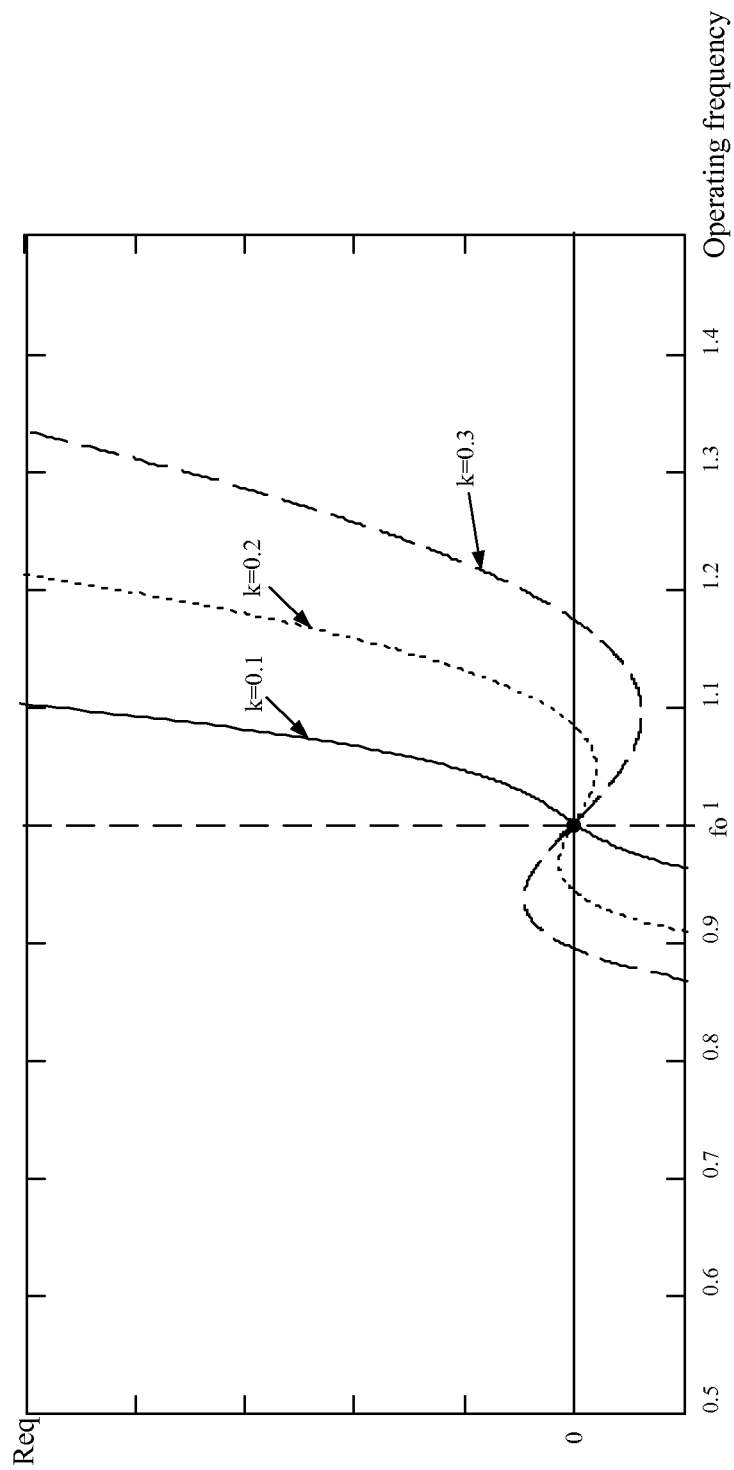
FIG. 1E is a graph illustrating the relationship of the input impedance of the power converter in FIG. 1A with different coupling factors k and the operating frequency.

Reference will now be made in detail to the present embodiments of the invention, examples of which are illustrated in the accompanying drawings. Wherever possible, the same reference numbers are used in the drawings and the description to refer to the same or like parts.

Although the terms "first," "second," etc., may be used herein to describe various elements, these elements should not be limited by these terms. These terms are used to distinguish one element from another.

In this document, the term "coupled" may also be termed as "electrically coupled", and the term "connected" may be termed as "electrically connected". "Coupled" and "connected" may also be used to indicate that two or more elements cooperate or interact with each other.

Figure 2:
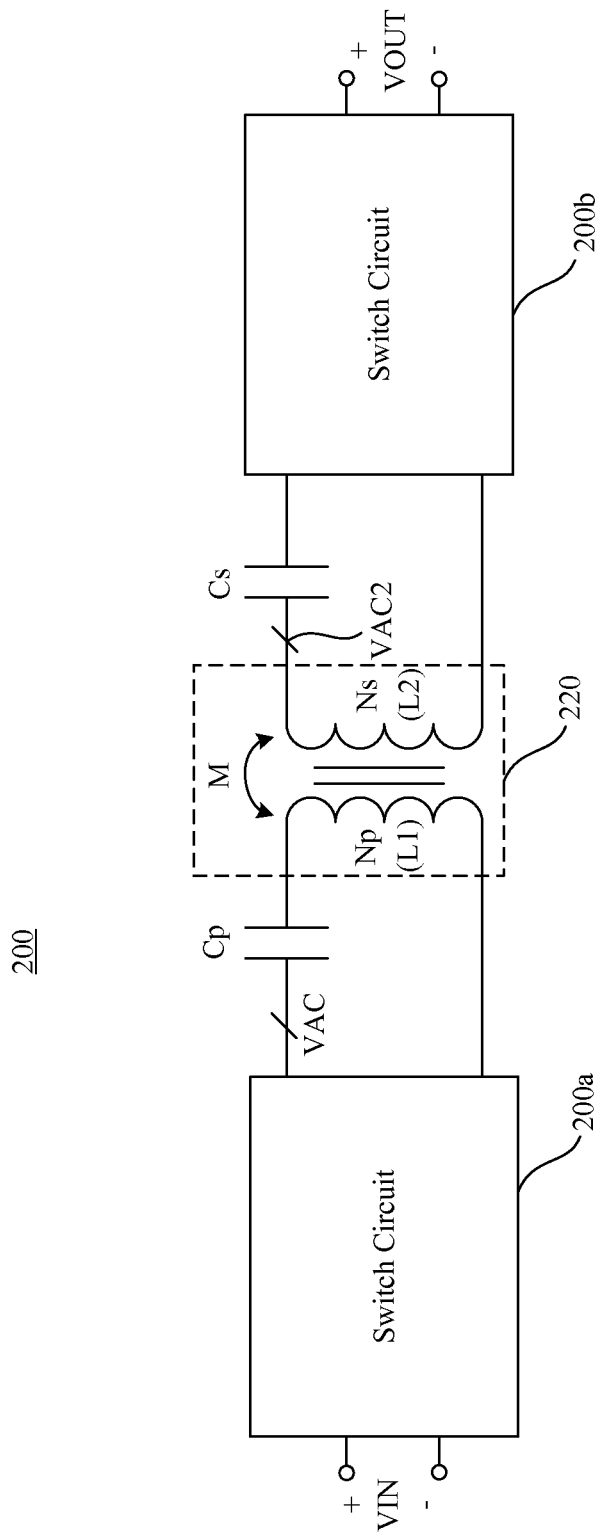
FIG. 2 is a schematic diagram of a power converter in accordance with one embodiment of the present disclosure.

FIG. 2 is a schematic diagram of a power converter 200 in accordance with one embodiment of the present disclosure. As shown in FIG. 2, the power converter includes a primary side compensation capacitor Cp, a transformer 220 and a secondary side compensation Cs. The primary side compensation capacitor Cp is electrically coupled to a primary winding NP of the transformer 220 in series, and configured to receive an alternating-current (AC) voltage VAC from a switch circuit 200a. The transformer 220 generates the AC voltage VAC2. The secondary side compensation capacitor Cs is electrically coupled to a secondary side winding Ns of the transformer 220 in series. The secondary side compensation capacitor Cs is configured to transmit VAC2 to a switch circuit 200b to generate a directing-current (DC) output voltage VOUT. An operating frequency of the aforementioned switch circuit 200a (i.e., the frequency of the AC voltage VAC) is set between 0.8×fa and 1.2×fb. The primary side compensation capacitor Cp and an equivalent primary side leakage inductance of the transformer 220 correspond to a first resonant frequency, and the secondary side compensation capacitor and an equivalent secondary side leakage inductance of the transformer 220 correspond to a second resonant frequency. The fa is the lower one of the first resonant frequency and the second resonant frequency, and the fb is the higher one of the first resonant frequency and the second resonant frequency. With such a configuration, a voltage gain Av of the power converter 200 with an empty load is at most 2 times of the voltage gain Av of the power converter 200 with a full load. Accordingly, compared with the power converter having the operating frequency set to the resonant frequency, corresponding to the primary side inductor L1 and the primary compensation capacitor Cp, used in some approaches, the voltage gain is more stabilized by setting the frequency of the AC voltage VAC between 0.8×fa and 1.2×fb.

The following paragraphs provide certain embodiments about the power converter 200 to illustrate functions and applications thereof. However, the present disclosure is not limited to the following embodiments.

Figure 3A:
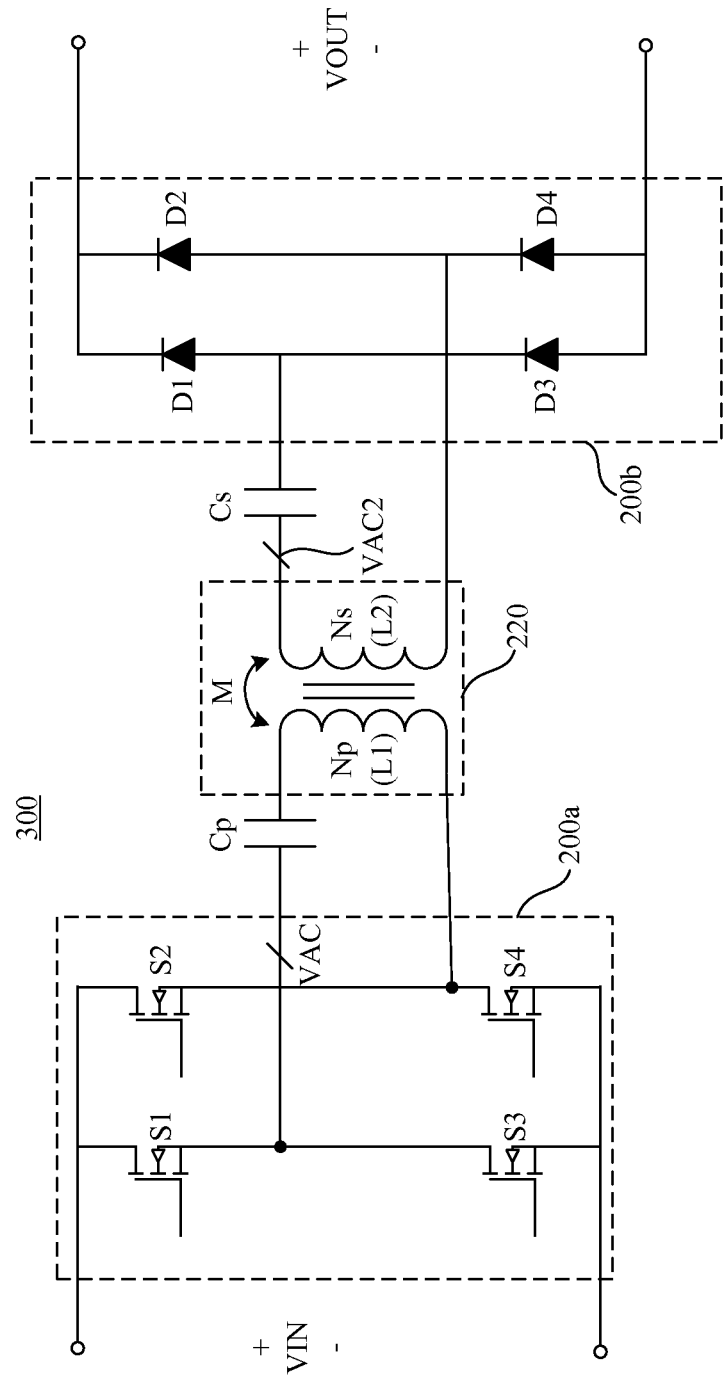
FIG. 3A is a schematic diagram of the power converter in accordance with one embodiment of the present disclosure.

Reference is made to FIG. 3A. FIG. 3A is a schematic diagram of the power converter 300 in accordance with one embodiment of the present disclosure. As shown in FIG. 3A, the inductance value of the primary winding Np of the transformer 220 is L1 (for simplicity, it's referred as the primary side inductor L1 in the following descriptions), and the inductance value of the secondary winding Ns of the transformer 220 is L2 (for simplicity, it's referred as the secondary side inductor L2 in the following descriptions). In addition, the aforesaid switch circuit 200a includes any types of inverter circuits. The switch circuit 200a includes a bridge arm, which includes two switch units electrically coupled in series. For illustration, as shown in FIG. 3A, the switch circuit 200a may be the full-bridge inverter circuit formed by the switches S1-S4. The switch S1 and the switch S3 form a bridge arm, and the switch S2 and the switch S4 form another bridge arm. The aforesaid switch circuit 200b may be any types of rectifying circuits. Similarly, the switch circuit 200b may also include a bridge arm, which includes two switch units electrically coupled in series. For illustration, as shown in FIG. 3A, the switch circuit 200b may be the bridge rectifier formed by the diodes D1-S4. The diode D1 and the diode D3 form a bridge arm, and the diode D2 and the diode D4 form another bridge arm. The aforementioned switch circuits 200a and 200b are only for illustrative purposes, the present disclosure is not limited thereof, and the person having ordinary skill in the art is able to choose suitable circuits in accordance with practical applications.

In operation, the switch circuit 200a is configured to generate the AC voltage VAC in accordance with the DC input voltage VIN. The primary side compensation capacitor Cp is electrically coupled to the primary winding NP in series to receive the AC voltage VAC. The secondary side compensation capacitor Cs is electrically coupled to secondary winding Ns in series. The transformer 220 generates the AC voltage VAC2 at the secondary winding Ns in accordance with the AC voltage VAC. The switch circuit 200b is configured to generate the DC output voltage VOUT in accordance with the AC voltage VAC2.

Specifically, in this embodiment, the frequency of the AC voltage is set between 0.8×fa and 1.2×fb by adjusting the operating frequency of the switches S1-S4 (i.e., switch circuit 200a) to between 0.8×fa and 1.2×fb. Thus, the power converter 300 may have the more stable voltage gain Av.

Figure 3B:
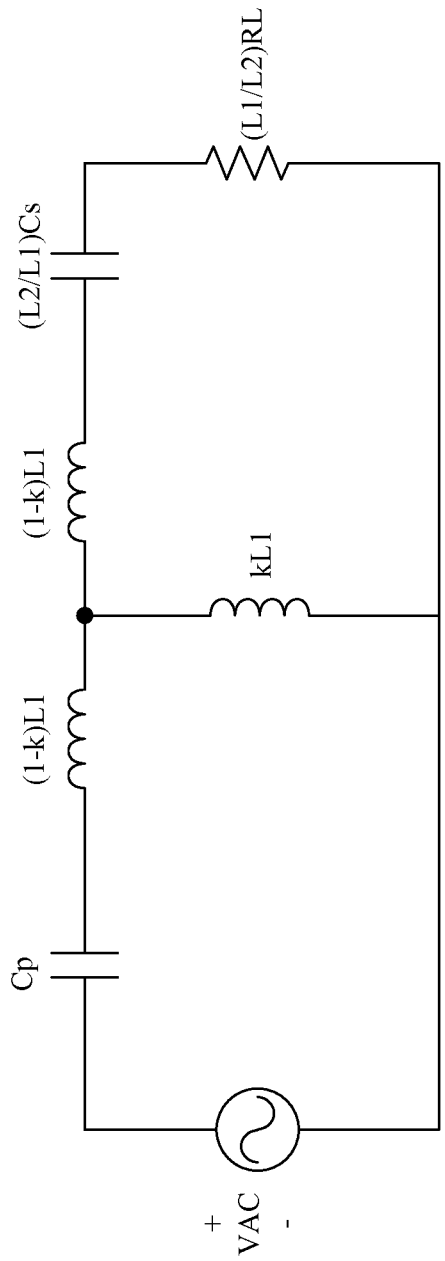
FIG. 3B is a schematic diagram of the equivalent circuit of the power converter in FIG. 3A in accordance with one embodiment of the present disclosure.

Reference is made to FIG. 3B. FIG. 3B is a schematic diagram of the equivalent circuit of the power converter 300 in accordance with one embodiment of the present disclosure. In FIG. 3B, the switch circuit 200 in FIG. 3A is equivalently considered as the AC voltage VAC, and the switch circuit 200 and its load are equivalently considered as RL. It's assumed that the resonant frequency, corresponding to the primary inductor L1 and the primary side compensation capacitor Cp, is equal to the resonant frequency corresponding to the secondary inductor L2 and the secondary side compensation capacitor Cs. That is, $1/\sqrt{(L1 \times Cp)} = 1/\sqrt{(L2 \times Cs)}$. Further, when the coupling factor k between the primary side and the secondary side is fixed, the aforesaid equation is further calculated as $1/\sqrt{(1-k)(L1 \times Cp)} = 1/\sqrt{(1-k)(L2 \times Cs)}$. The term of $(1-k) \times L1$ in the aforesaid equation is referred as an equivalent primary side leakage inductance of the transformer 220, and the term of the $(1-k) \times L2$ in the aforesaid equation is referred as the equivalent secondary side leakage inductance of the transformer 220. In other words, when the resonant frequency, corresponding to the primary inductor L1 and the primary side compensation capacitor Cp, is equal to the resonant frequency corresponding to the secondary inductor L2 and the secondary side compensation capacitor Cs and the coupling factor k is fixed, the resonant frequency corresponding to the equivalent primary side leakage inductance $(1-k) \times L1$ of the transformer 220 and the primary side compensation capacitor Cp (which is referred as the resonant frequency fr in the following paragraphs) is equal to the resonant frequency corresponding to the equivalent secondary side leakage inductance $(1-k) \times L2$ of the transformer 220 and the secondary side compensation capacitor Cs.

Figure 3C:
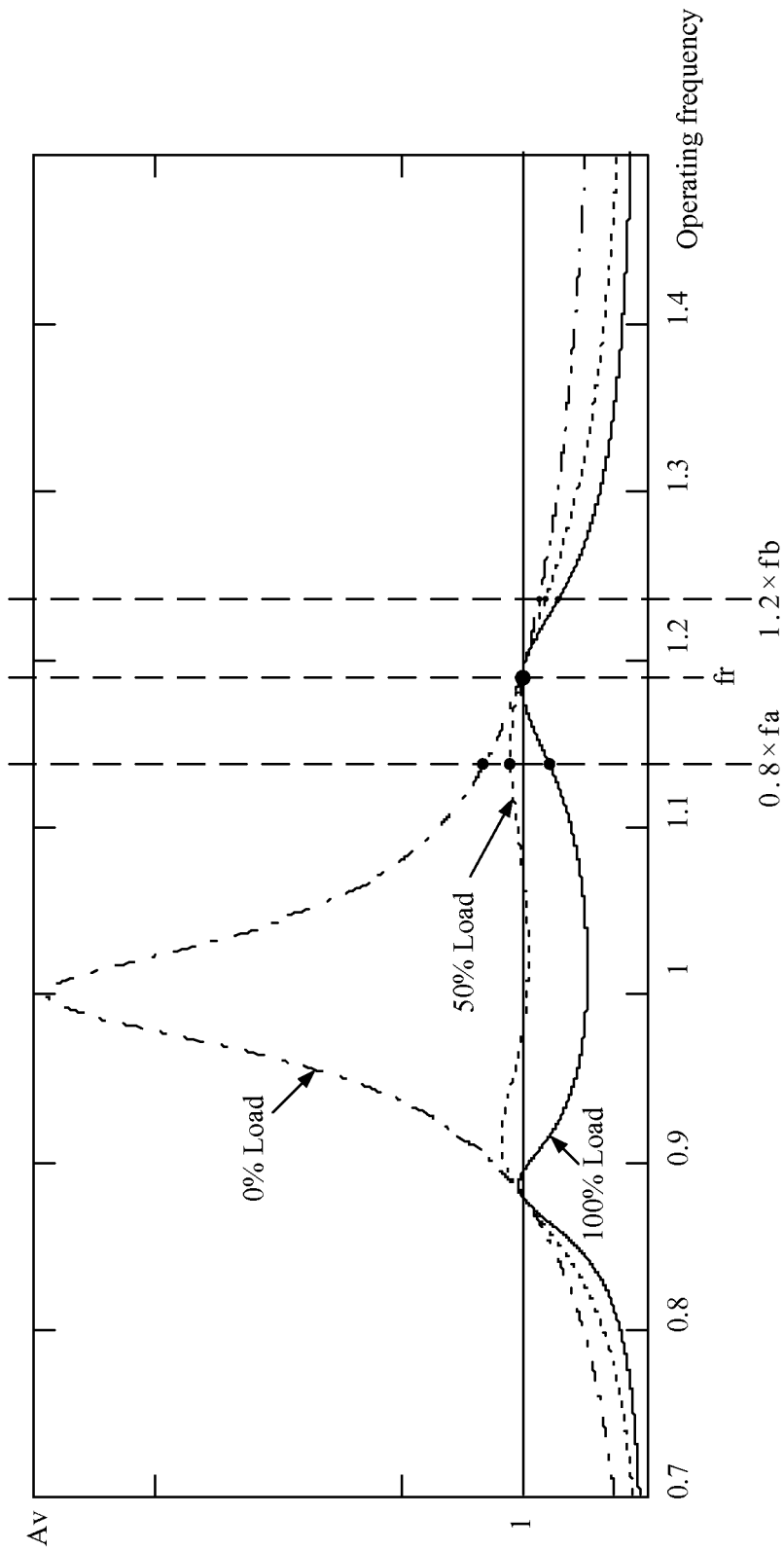
FIG. 3C is a graph illustrating the relationship of the voltage gain AV of the power converter in FIG. 3A with different load and the operating frequency in accordance with one embodiment of the present disclosure.

Reference is made to FIG. 3C. FIG. 3C is a graph illustrating the relationship of the voltage gain AV of the power converter 300 with different load and the operating frequency in accordance with one embodiment of the present disclosure. The operating frequency in FIG. 3C is the ratio of the operating frequency fo and the resonant frequency corresponding to the primary side inductor L1 and the primary side compensation capacitor Cp, and the voltage gain Av is the ratio of the DC output voltage VOUT and the DC input voltage VIN. In this embodiment, it's assumed that the coupling factor k is a constant, and the operating frequency of the power converter 300 is set to be equal to the resonant frequency fr corresponding to equivalent primary side leakage inductance $(1-k) \times L1$ and the primary side compensation capacitor Cp. In other words, in this embodiment, the power converter 300 configures the frequency of the AC voltage VAC between the resonant frequency fr corresponding to the equivalent primary side leakage inductance $(1-k) \times L1$ and the primary side compensation capacitor Cp by using the switch circuit 200a. As shown in FIG. 3C, the frequency of the AC voltage VAC is set to the resonant frequency fr by the switch circuit 200a, and the voltage gain of the power converter 300 is thus more stable under different loads.

However, in practical applications, the resonant frequency, corresponding to the equivalent primary side leakage inductance $(1-k) \times L1$ in the transformer 220 and the primary side compensation capacitor Cp, may not equal to the resonant frequency, corresponding to the equivalent secondary side leakage inductance $(1-k) \times L2$ in the transformer 220 and the secondary side compensation capacitor Cs, under the affections of the operating circumstance and the manufacturing process. Hence, as shown in FIG. 3C, the primary side compensation capacitor Cp and the equivalent primary side leakage inductance $(1-k) \times L1$ of the transformer 220 correspond to a first resonant frequency correspond to a first resonant frequency, and the secondary side compensation capacitor Cs and the equivalent secondary side leakage inductance $(1-k) \times L2$ of the transformer 220 correspond to a second resonant frequency. In FIG. 3C, the fa is the lower one of the first resonant frequency and the second resonant frequency, and the fb is the higher one of the first resonant frequency and the second resonant frequency. In general, the deviation of the capacitance value is about ±20%. Thus, the fb is at most 1.5 times of the fa. In this embodiment, the operating frequency of the switch circuit 200a is further adjusted between 0.8×fa and 1.2×fb, so as to set the frequency of the AC voltage VAC between 0.8×fa and 1.2×fb. Thus, the voltage gain Av of the power converter 300 with an empty load is at most 2 times of the voltage gain Av of the power converter 300 with a full load.

Furthermore, in yet embodiment, the power converter 300 further adjusts the operating frequency of the switch circuit 200a between 0.94×fa and 1.065×fb, so that the voltage gain Av of the power converter 300 with the empty load is at most 1.2 times of the voltage gain Av of the power converter 300 with the full load.

Figure 4A:
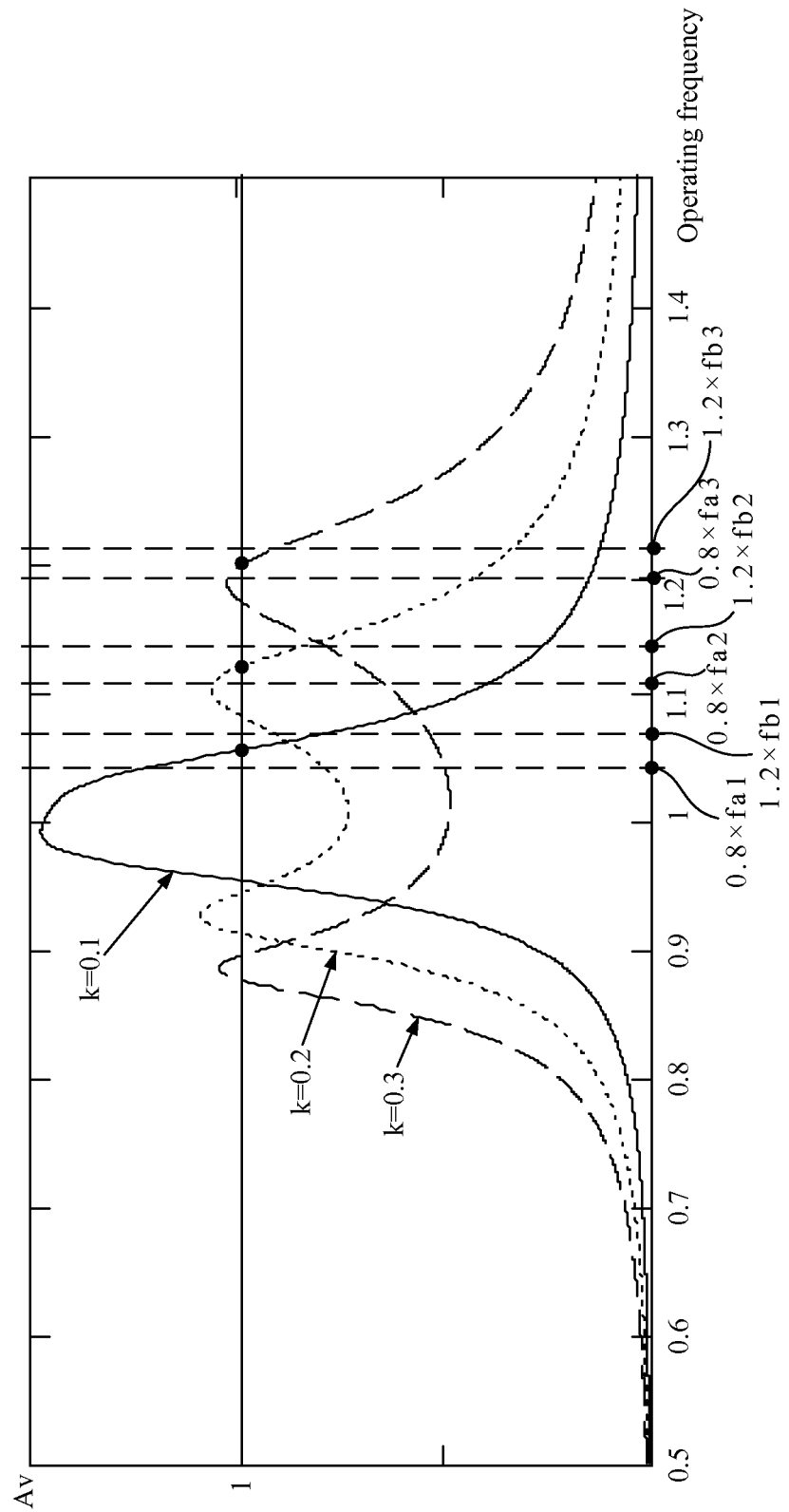
FIG. 4A is a graph illustrating the relationship of the voltage gain AV of the power converter in FIG. 3A with different coupling factors k and the operating frequency in accordance with one embodiment of the present disclosure.
Figure 4B:
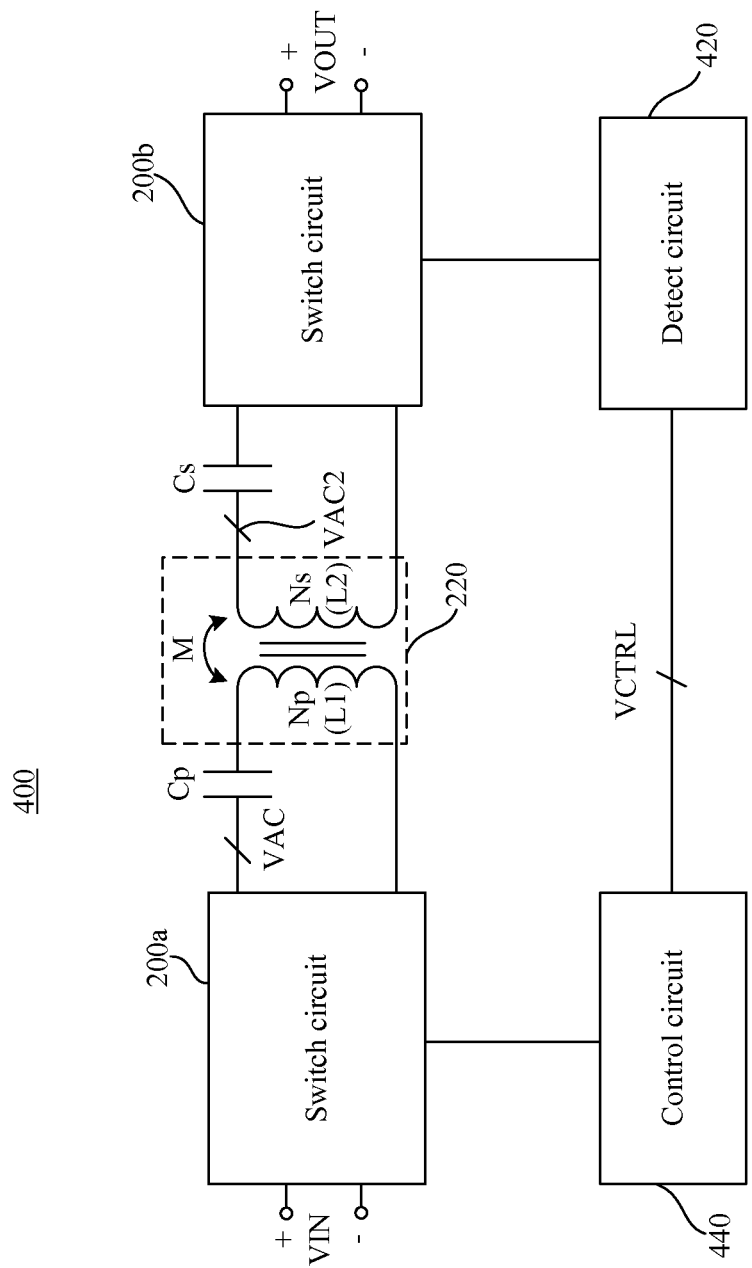
FIG. 4B is a schematic diagram of a power converter in accordance with one embodiment of the present disclosure.

Reference is made to both of the FIG. 4A and FIG. 4B. FIG. 4A is a graph illustrating the relationship of the voltage gain AV of the power converter 300 with different coupling factors k and the operating frequency in accordance with one embodiment of the present disclosure, and FIG. 4B is a schematic diagram of a power converter 400 in accordance with one embodiment of the present disclosure. The definitions of the operating frequency and the voltage gain Av in FIG. 4A are same with the FIG. 3C. In FIG. 4a, fa1, fa2 and fa3 corresponds to the lower one of the first resonant frequency and the second resonant frequency of the power convert 300 under the conditions that the coupling factor k=0.1, 0.2 and 0.3, respectively. Similarly, fb1, fb2 and fb3 corresponds to the higher one of the first resonant frequency and the second resonant frequency of the power convert 300 under the conditions that the coupling factor k=0.1, 0.2 and 0.3, respectively. The power converter 300 corresponds the first resonant frequency corresponding to the equivalent primary side leakage inductance of the transformer 220 and the primary side compensation capacitor Cp under the conditions that the coupling factor k=0.1, 0.2 and 0.3, respectively. The power converter 300 corresponds the second resonant frequency corresponding to the equivalent secondary side leakage inductance of the transformer 220 and the secondary side compensation capacitor Cs under the conditions that the coupling factor k=0.1, 0.2 and 0.3, respectively. As shown in FIG. 4A, the coupling factor k of the transformer 220 may be deviated under the affections of the operating circumstance and aging elements in practical applications, and the voltage gain Av of the power converter 300 accordingly changes. Due the voltage gain Av is affected by the coupling factor k, the DC output voltage VOUT changes as well. Therefore, in practical applications, the power converter 300 further controls the operating frequency of the switch circuit 200a in accordance with the DC output voltage VOUT, so as to adjust the frequency of the AC voltage VAC.

As shown in FIG. 4B, the power converter 400 further includes a detect circuit 420 and a control circuit 440. The detect circuit 420 is electrically coupled to the switch 200b, and is configured to generate a control signal VCTRL in accordance with the DC output voltage VOUT. The control circuit 440 is electrically coupled between the switch circuit 200a and the detect circuit 420, and is configured to control the operating frequency of the switch circuit 200a. Thus, when the coupling factor k of the transformer 220 deviates, the frequency of the AC voltage VAC is further adjusted to be between 0.8×fa and 1.2×fb. The detect circuit 420 includes a voltage or current sensing circuit, and the control circuit 440 includes any frequency modulation control circuit, such as a pulse frequency modulation (PFM) circuit, etc. The person having ordinary skill in the art is able to configure these circuits arbitrarily.

In brief, the detect circuit 420 and the control circuit 440 form a feedback path. When the DC output voltage VOUT deviates with different coupling factors k, the power converter 400 is able to perform the corresponding frequency modulation through the aforementioned feedback path, so as to obtain a stable voltage gain Av.

Furthermore, in each of embodiments above, when the inductance value of the secondary winding Ns (i.e., the secondary side inductor L2) is N times of the inductance value of the primary winding Np (i.e., the primary side inductor L1), that is, the equivalent secondary side leakage inductance $(1-k) \times L2$ is N times of the equivalent primary side leakage inductance (1−k)×L1, the capacitance value of the secondary side compensation capacitor Cs is able to set to be 1/N times of the capacitance value of the primary side compensation capacitor Cp, wherein N>0, N is any integers or fractions which is much than zero. Thus, the resonant frequency, corresponding to the equivalent primary side leakage inductance (1−k)×L1 and the primary side compensation capacitor Cp, is equal to the resonant frequency, corresponding to the equivalent secondary side leakage inductance (1−k)×L2 and the secondary side compensation capacitor Cs, theoretically. Accordingly, when the operating frequency of the aforementioned power converters is set between 0.8×fa and 1.2×fb, the voltage gain AV with different loads is able to be stable.

It's should be noticed that, in each of embodiments above, the power converter is enabled with the operating frequency being greater than or equal to 5 times of the resonant frequency fr, so as to reduce the rush currents in the resonant tank formed by the primary side compensation capacitor Cs and the primary winding Ns.

Figure 5:
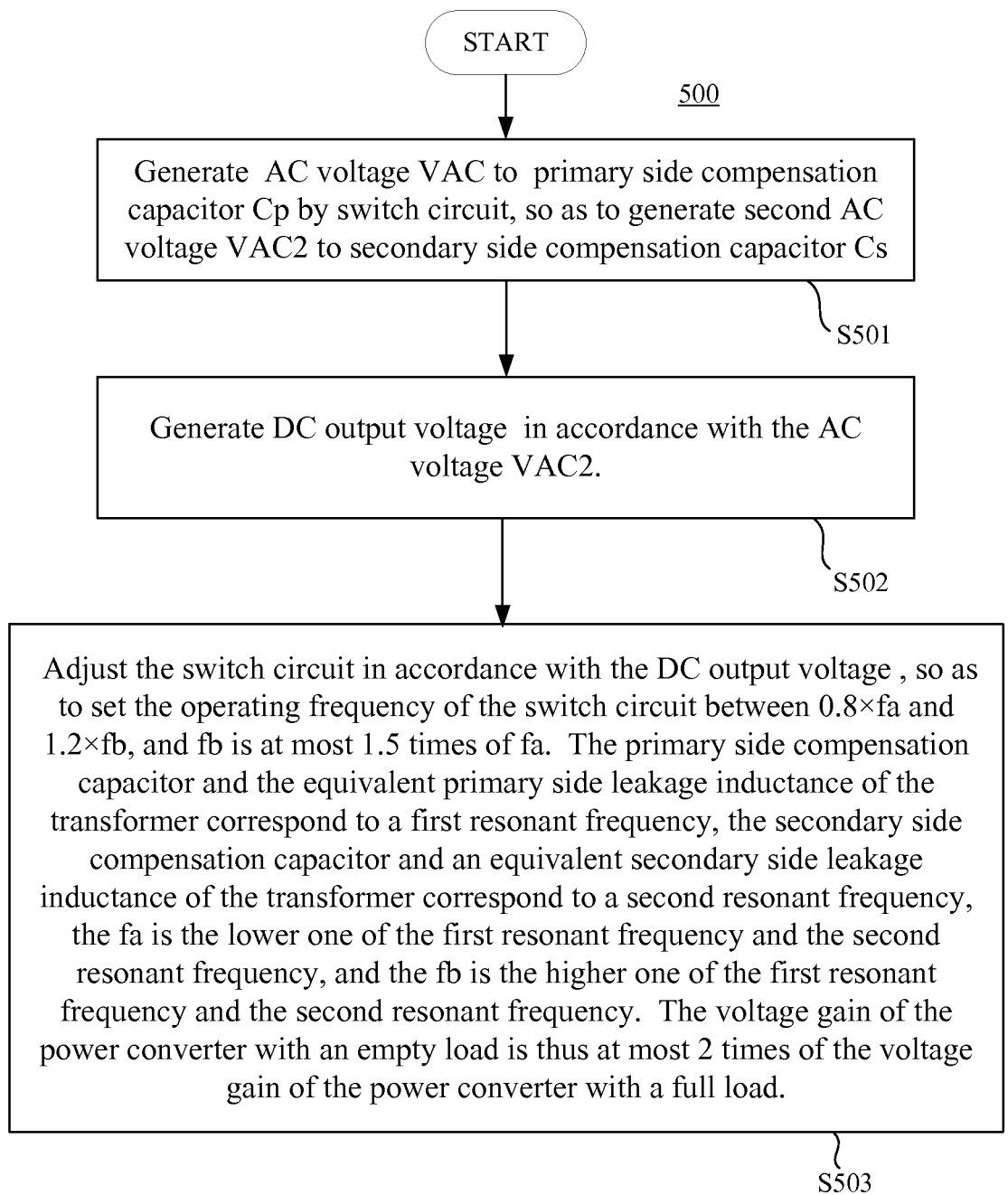
FIG. 5 is a flow chart of a method of stabilizing a voltage gain in accordance with one embodiment of the present disclosure.

Reference is made to FIG. 5. FIG. 5 is a flow chart of a method 500 of stabilizing a voltage gain in accordance with one embodiment of the present disclosure. Another aspect of the present disclosure provides the method 500 of stabilizing the voltage gain, which is adapted to the power converter 200 in FIG. 2. As shown in FIG. 5, the method 500 of stabilizing the voltage gain includes steps S501-S503.

In step S501, an AC voltage VAC is provided from a switch circuit to the primary side compensation capacitor Cp, so as to generate the AC voltage VAC2 to the secondary side compensation capacitor Cs. For illustration, as shown in FIG. 3A, the switch circuit 200a generates the AC voltage VAC to the primary side compensation capacitor Cp in accordance with the DC input voltage VIN, so as to generate the AC voltage VAC2 to the secondary side compensation capacitor Cs. The switch circuit 200a may be any types of inverter circuits In step S502, the DC output voltage is generated in accordance with the AC voltage VAC2. For illustration, as shown in FIG. 3A, the switch circuit 200b is further provided to generate the DC output voltage VOUT, wherein the switch circuit 200b is electrically coupled to the secondary compensation capacitor Cs, and the switch circuit 200b may be any types of rectifying circuits.

In step S503, the switch circuit 200a is adjusted in accordance with the DC output voltage VOUT, so as to set the operating frequency of the switch circuit 200a between 0.8×fa and 1.2×fb, and fb is at most 1.5 times of fa. The primary side compensation capacitor and the equivalent primary side leakage inductance of the transformer correspond to a first resonant frequency, the secondary side compensation capacitor and an equivalent secondary side leakage inductance of the transformer correspond to a second resonant frequency, the fa is the lower one of the first resonant frequency and the second resonant frequency, and the fb is the higher one of the first resonant frequency and the second resonant frequency. The voltage gain of the power converter with an empty load is thus at most 2 times of the voltage gain of the power converter with a full load. As a result, as shown in FIG. 4A, a more stable voltage gain of the power converter is obtained within the range of operating frequency. In this embodiment, as shown in FIG. 3A, the operating frequency of the switch circuit 200a is adjusted to configure the frequency of the AC voltage VAC. In yet embodiment in the present disclosure, the frequency of the AC voltage VAC is further set between 0.94×fa and 1.065×fb, the voltage gain Av of the power converter with the empty load is at most 1.2 times of the voltage gain Av of the power converter with the full load.

Further, the method 500 further includes the step of generating control signal VCTRL in accordance with the DC output voltage VOUT, and adjusting the operating frequency of the inverter circuit (i.e., the switch circuit 200a), which is in response to the coupling factor k of the transformer deviates. For illustration, as shown in FIG. 4B, the power converter 400 controls the frequency of the AC voltage VAC by using the feedback path formed by the detect circuit 420 and the control circuit 440, so as to obtain a more stable voltage gain Av of the power converter 400 when the coupling factor k deviates.

In the method 500, in order to make the resonant frequency, corresponding to the equivalent primary side leakage inductance and the primary side compensation capacitor Cp, be equal to the resonant frequency, corresponding to the equivalent secondary side leakage inductance and the secondary side compensation capacitor Cs, theoretically. When the inductance value L2 of the secondary winding Ns is N times of the inductance value L1 of the primary winding Np, the capacitance value Cs of the secondary side compensation capacitor Cs is set to be 1/N times of the capacitance value Cp of the primary side compensation capacitor Cp, wherein N>0, N is any integers or fractions which is much than zero. Accordingly, by using the method 500, the voltage gain Av of the power converter is much stable under different loads.

In summary, the power converter in the present disclosure has a more stable voltage gain with different loads and different coupling factors k. As a result, the operation safety of the power converter under any operation circumstances is improved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the invention. In view of the foregoing, it is intended that the present disclosure cover modifications and variations of this invention provided they fall within the scope of the following claims.

What is claimed is:

1. A power converter, comprising:
   a primary side compensation capacitor configured to receive a first AC voltage from a first switch circuit;
   a transformer, comprising a primary winding and a secondary winding, the transformer being configured to receive the first AC voltage to generate a second AC voltage, and the primary winding of the transformer being electrically coupled to the primary side compensation capacitor in series; and
   a secondary side compensation capacitor electrically coupled to the secondary winding of the transformer in series, and configured to transmit the second AC voltage to a second switch circuit to generate a DC output voltage,
   wherein an operating frequency of the first switch circuit is set between 0.8×fa and 1.2×fb, where the fb is at most 1.5 times of the fa, and wherein the primary side compensation capacitor and an equivalent primary side leakage inductance of the transformer correspond to a first resonant frequency, the secondary side compensation capacitor and an equivalent secondary side leakage inductance of the transformer correspond to a second resonant frequency, the fa is the lower one of the first resonant frequency and the second resonant frequency, and the fb is the higher one of the first resonant frequency and the second resonant frequency, so that a voltage gain of the power converter with an empty load is at most 2 times of the voltage gain of the power converter with a full load.

2. The power converter of claim 1, further comprising:
a detect circuit configured to generate a control signal in accordance with the DC output voltage; and
a control circuit configured to control the operating frequency of the first switch circuit in accordance with the control signal, so as to set the operating frequency between 0.8×fa and 1.2×fb when a coupling factor of the transformer deviates.

3. The power converter of claim 1, wherein the first switch circuit is an inverter circuit configured to generate the first AC voltage in accordance with the DC input voltage.

4. The power converter of claim 3, wherein the first switch circuit comprises a bridge arm that comprises two switch units electrically coupled in series.

5. The power converter of claim 1, wherein the second switch circuit is a rectifying circuit configured to generate the DC output voltage in accordance with the second AC voltage.

6. The power converter of claim 5, wherein the second switch circuit comprises a bridge arm that comprises two switch units electrically coupled in series.

7. The power converter of claim 1, wherein the capacitance value of the secondary compensation capacitor is 1/N times of the capacitance value of the primary compensation capacitor, when the inductance value of the secondary winding is N times of the inductance value of the primary winding, wherein N>0.

8. The power converter of claim 1, wherein the operating frequency of the first switch circuit is further set between 0.94×fa to 1.065×fb, so that the voltage gain of the power converter with the empty load is at most 1.2 times of the voltage gain of the power converter with the full load.

9. The power converter of claim 2, wherein the operating frequency of the first switch circuit is further set between 0.94×fa to 1.065×fb, so that the voltage gain of the power converter with the empty load is at most 1.2 times of the voltage gain of the power converter with the full load.

10. The power converter of claim 3, wherein the operating frequency of the first switch circuit is further set between 0.94×fa to 1.065×fb, so that the voltage gain of the power converter with the empty load is at most 1.2 times of the voltage gain of the power converter with the full load.

11. The power converter of claim 4, wherein the operating frequency of the first switch circuit is further set between 0.94×fa to 1.065×fb, so that the voltage gain of the power converter with the empty load is at most 1.2 times of the voltage gain of the power converter with the full load.

12. The power converter of claim 5, wherein the operating frequency of the first switch circuit is further set between 0.94×fa to 1.065×fb, so that the voltage gain of the power converter with the empty load is at most 1.2 times of the voltage gain of the power converter with the full load.

13. The power converter of claim 6, wherein the operating frequency of the first switch circuit is further set between 0.94×fa to 1.065×fb, so that the voltage gain of the power converter with the empty load is at most 1.2 times of the voltage gain of the power converter with the full load.

14. The power converter of claim 7, wherein the operating frequency of the first switch circuit is further set between 0.94×fa to 1.065×fb, so that the voltage gain of the power converter with the empty load is at most 1.2 times of the voltage gain of the power converter with the full load.

15. A power converter, comprising:
a first switch circuit configured to generate a first AC voltage in accordance with a DC input voltage;
a primary side compensation capacitor configured to receive the first AC voltage;
a transformer, comprising:
a primary winding electrically coupled to the primary side compensation capacitor in series; and
a secondary winding configured to generate a second AC voltage in accordance with the first AC voltage;
a secondary side compensation capacitor electrically coupled to the secondary winding in series;
a second switch circuit configured to generate a DC output voltage in accordance with the second AC voltage;
a detect circuit configured to generate a control signal in accordance with the DC output voltage; and
a control circuit configured to control the first switch circuit in accordance with the control signal to set an operating frequency of the first switch circuit between 0.8×fa and 1.2×fb, where the fb is at most 1.5 times of the fa, and wherein the primary side compensation capacitor and an equivalent primary side leakage inductance of the transformer correspond to a first resonant frequency, the secondary side compensation capacitor and an equivalent secondary side leakage inductance of the transformer correspond to a second resonant frequency, the fa is the lower one of the first resonant frequency and the second resonant frequency, and the fb is the higher one of the first resonant frequency and the second resonant frequency, so that a voltage gain of the power converter with an empty load is at most 2 times of the voltage gain of the power converter with a full load.

16. The power converter of claim 15, wherein the operating frequency of the first switch circuit is further set between 0.94×fa and 1.065×fb, so that the voltage gain of the power converter with an empty load is at most 1.2 times of the voltage gain of the power converter with a full load.

17. A method of stabilizing a voltage gain of a power converter, the power converter comprising a primary side compensation capacitor, a transformer and a secondary side compensation capacitor, the primary side compensation capacitor being electrically coupled to a primary winding of the transformer in series, and the secondary side compensation capacitor being electrically coupled to a secondary winding of the transformer in series, the method comprising:
generating a first AC voltage to the primary side compensation capacitor by a switch circuit, so as to generate a second AC voltage to the secondary side compensation capacitor;
generating a DC output voltage in accordance with the second AC voltage; and
adjusting the switch circuit in accordance with the DC output voltage, so as to set an operating frequency of the switch circuit between 0.8×fa and 1.2×fb, and the fb is at most 1.5 times of the fa,
wherein the primary side compensation capacitor and an equivalent primary side leakage inductance of the transformer correspond to a first resonant frequency, the secondary side compensation capacitor and an equivalent secondary side leakage inductance of the transformer correspond to a second resonant frequency, the fa is the lower one of the first resonant frequency and the second resonant frequency, and the fb is the higher one of the first resonant frequency and the second resonant frequency, so that a voltage gain of the power converter with an empty load is at most 2 times of the voltage gain of the power converter with a full load.

18. The method of claim 17, further comprising:
providing a DC input voltage to the switch circuit to generate the first AC voltage, wherein the switch circuit comprises an inverter circuit, and the inverter circuit comprises a bridge arm that comprises two switch units electrically coupled in series.

19. The method of claim 17, wherein the step of generating the DC output voltage further comprises:
providing the second AC voltage to a rectifying circuit to generate the DC output voltage.

20. The method of claim 17, further comprising:
setting the capacitance value of the secondary side compensation capacitor to be 1/N times of the capacitance value of the primary side compensation capacitor, when the inductance value of the secondary winding is N times of the inductance value of the primary winding, wherein N>0.

21. The method of claim 17, further comprising:
setting the operating frequency of the switch circuit between 0.94×fa and 1.065×fb, so that the voltage gain of the power converter with an empty load is at most 1.2 times of the voltage gain of the power converter with a full load.

22. The method of claim 18, further comprising:
setting the operating frequency of the switch circuit between 0.94×fa and 1.065×fb, so that the voltage gain of the power converter with an empty load is at most 1.2 times of the voltage gain of the power converter with a full load.

23. The method of claim 19, further comprising:
setting the operating frequency of the switch circuit between 0.94×fa and 1.065×fb, so that the voltage gain of the power converter with an empty load is at most 1.2 times of the voltage gain of the power converter with a full load.

24. The method of claim 20, further comprising:
setting the operating frequency of the switch circuit between 0.94×fa and 1.065×fb, so that the voltage gain of the power converter with an empty load is at most 1.2 times of the voltage gain of the power converter with a full load.

* * * * *